United States Patent
Tsunoda et al.

(10) Patent No.: US 8,271,518 B2
(45) Date of Patent: Sep. 18, 2012

(54) NEAREST NEIGHBOR SEARCH METHOD

(75) Inventors: Masaya Tsunoda, Kobe (JP); Arjun Yadav, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 169 days.

(21) Appl. No.: 12/897,003

(22) Filed: Oct. 4, 2010

(65) Prior Publication Data

US 2011/0119292 A1    May 19, 2011

(30) Foreign Application Priority Data

Nov. 19, 2009  (JP) .................................. 2009-264202

(51) Int. Cl.
  *G06F 17/30* (2006.01)
  *G06F 7/00* (2006.01)
(52) U.S. Cl. ......... 707/769; 707/737; 707/752; 707/747
(58) Field of Classification Search .................. 707/769, 707/737, 752, 747
  See application file for complete search history.

(56) References Cited

U.S. PATENT DOCUMENTS 8,171,030 B2 * 5/2012 Pereira et al. ................. 707/741
2010/0070509 A1 * 3/2010 Li et al. ......................... 707/747

FOREIGN PATENT DOCUMENTS

JP    2003-242151 A    8/2003

* cited by examiner

*Primary Examiner* — Ann Chempakaseril
(74) *Attorney, Agent, or Firm* — Birch, Stewart, Kolasch & Birch, LLP (57) ABSTRACT

A method of searching real numbers for a nearest neighbor to a query point includes a construction phase in which a database of the real numbers is prepared; and a search phase in which the nearest neighbor is searched by the use of the database. The database includes a series of buckets that respectively correspond to small one-dimensional spaces defined by dividing a one-dimensional space between a minimum real number and a maximum real number at regular intervals. The buckets include data about real number(s) falling in one of the small one-dimensional spaces corresponding to the bucket concerned, and the number of the real number(s). The search phase includes locating one of the buckets in which the query point falls; checking the bucket size of the located bucket whether the bucket size thereof is zero; and searching the nearest neighbor by the use of the data in the bucket.

11 Claims, 6 Drawing Sheets

NEAREST NEIGHBOR SEARCH METHOD

BACKGROUND OF THE INVENTION

The present invention relates to a nearest neighbor search method, more particularly to a computer-oriented fast search method of searching a set of real numbers for a real number closest to a query point (or real number) by the use of a prepared database of the real numbers.

In a computer simulation, a numerical analysis using a computer and the like, it is often required to search a large number of real numbers for a nearest neighbor to a query point (query number). For example, in the case of an aerodynamical simulation, it is necessary to import surface coordinates of a moving body (Lagrangian elements) in the coordinate system of a structured grid (Euler elements).
In this case, if the number of real numbers to be searched is very large (for example more than one hundred million), the number of the query points is very large (for example more than one million), and/or the search is repeated a large number of times, then there is a possibility that the computing time reaches to several hours to a day.

Accordingly, in order to decrease such computing time and thereby to reduce the computational cost, many attempts have been proposed.

Heretofore, two types of methods have been employed in order to solve this kind of problem.

The first method is what is called whole search in which the query point q is compared with the sorted real numbers from the first real number $x[1]$ to the last real number $x[n]$ one by one until the magnitude relation is reversed. For example, if a real number $x[ipoint]$ satisfying a condition:

$$x[ipoint] \leq q < x[ipoint+1]$$

then the solution is this real number $x[ipoint]$.

The second method is what is called bisection method or kd-tree method widely used in recent years as a more efficient method than the first method.

Furthermore, ANN (Approximate Nearest Neighbor) method which is a combination of the former two methods is also used in recent years.

However, in the above-mentioned methods (ANN, kd-tree), the advantageous effect decreases if the dimensions of the search points is increased to three dimensions because the difference from the whole search becomes small.
Further, as the dimensions are increased, the tree becomes complex, and the search ranges increase, therefore, the computing time increases.

SUMMARY OF THE INVENTION

It is therefore, an object of the present invention to provide a fast nearest neighbor search method, in which a database of a set of real numbers is prepared beforehand, and a nearest neighbor search is performed by the use of the database, therefore, the computing time can be greatly decreased.

According to the present invention, a set of real numbers $x[i]$ (i: 1 to n) and a query point q (real number) are given as one-dimensional values, and a nearest neighbor search method comprises
a construction phase in which a database of the real numbers $x[i]$ (i: integers from 1 to n, assigned in ascending order of the real numbers) is prepared in a main memory unit of a computing device, and
a search phase in which the computing device searches the nearest neighbor to the query point q by the use of the database, wherein
the database comprises a series of buckets,
the buckets respectively correspond to small one-dimensional spaces defined by dividing a one-dimensional space between a minimum real number $x[1]$ and a maximum real number $x[n]$ at regular intervals, whereby the number of the buckets and the number of the small one-dimensional spaces are the same integral number m,
the buckets have unique bucket indexes from the first bucket $B[1]$ to the last bucket $B[m]$,
each of the buckets comprises data about real number(s) falling in one of the small one-dimensional spaces corresponding to the bucket concerned,
each of the buckets further comprises data about its bucket size, the bucket size defined by the number of real number(s) falling in one of the small one-dimensional spaces which corresponds to the bucket concerned,
each of the buckets excepting the first bucket $B[1]$ further comprises data about the bucket index of a last filled bucket, the last filled bucket defined as a bucket whose bucket size is not zero and whose bucket index is closest to that of the concerned bucket, and
the search phase comprises:
a first step of locating one of the buckets corresponding to one of the small one-dimensional spaces in which the query point q falls,
a second step of checking the bucket size of the located bucket whether the bucket size thereof is zero or not,
a third step of searching the nearest neighbor by the use of the data of real number(s) included in
the located bucket if the checked bucket size is not zero, or
a bucket with a bucket index equal to the bucket index of the last filled bucket included in the located bucket if the checked bucket size is zero.

DESCRIPTION OF THE PREFERRED EMBODIMENTS

Embodiments of the present invention will now be described in detail in conjunction with the accompanying drawings.

In the nearest neighbor search method according to the present invention, a set of real numbers $x[i]$ and a query point q (a real number) are given, and the real numbers $x[i]$ are searched for a nearest neighbor namely a real number closest to the query point q, wherein the nearest neighbor search is performed by the use of a database of the real numbers $x[i]$ (wherein "i" is an integral numbers from 1 to n, and $x[1] < x[2] < x[3] < \cdots < x[n-1] < x[n]$).

The nearest neighbor search method is performed by a computing device. The computing device in this embodiment is a general-purpose computer system. But, the computing device may be a dedicated purpose built-in computer.

Figure 1:
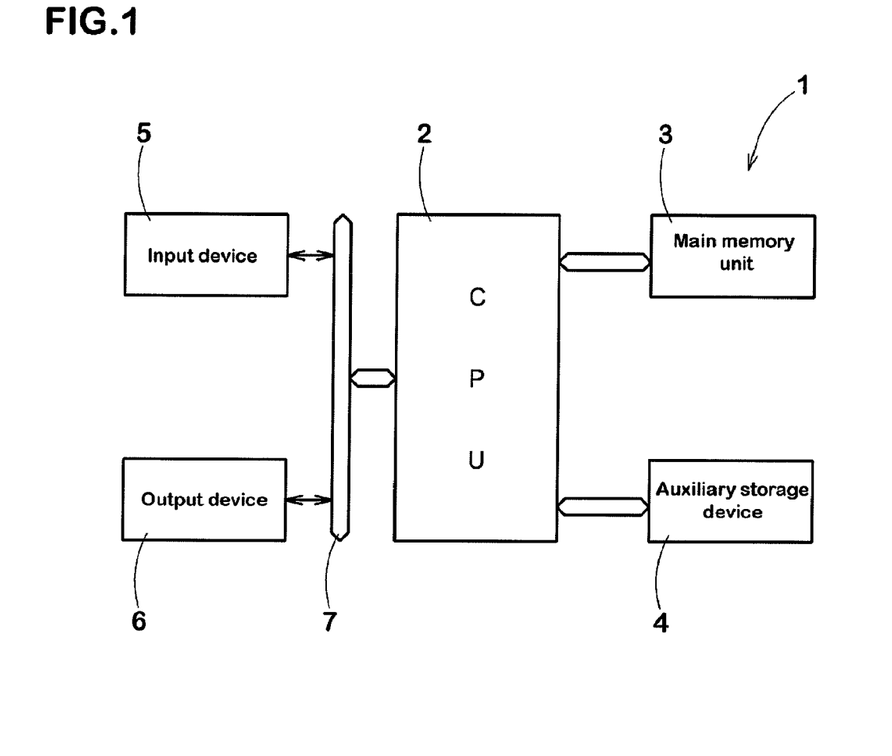
FIG. 1 is a block diagram of a computing device for performing the nearest neighbor search according to the present invention.

As shown in FIG. 1, the computing device 1 in this embodiment comprises: a central processing unit 2; a main memory unit 3 functionable as working memories; an auxiliary storage device 4, e.g. a hard disk and the like; an input device 5, e.g. keyboard, mouse and the like; an output device 6, e.g. display, printer and the like; an interface 7 connecting the IO devices 5 and 6. In the auxiliary storage device 4, there is stored programs by which the computing device 1 executes the nearest neighbor search method of the present invention.

Figure 2:
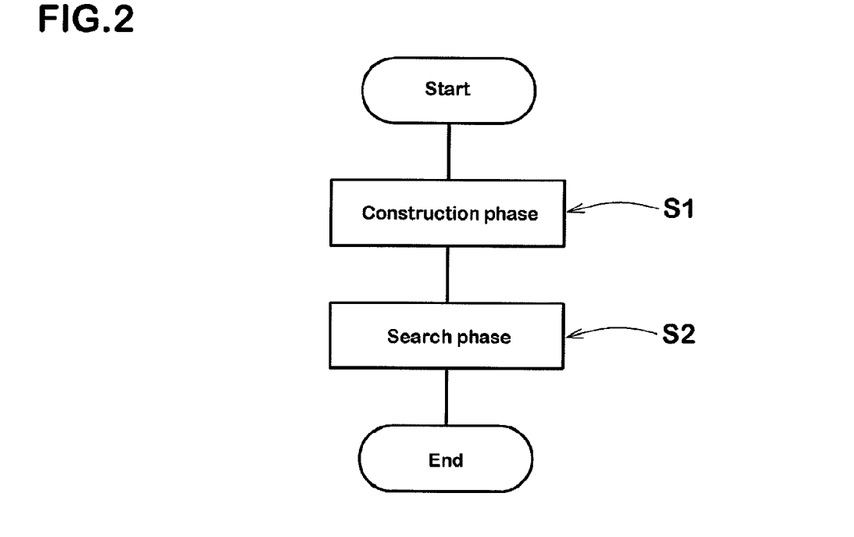
FIG. 2 is a flowchart of the nearest neighbor search method of the present invention.

As shown in FIG. 2, the nearest neighbor search method according to the present invention comprises:
a construction phase S1 in which the database is prepared; and
a search phase S2 in which one of the real numbers $x[i]$ which is closest to the query point q is searched by the use of the database.

The construction phase S1 is performed only once before the search phase S2.

In the construction phase S1, the real numbers $x[i]$ are sorted in ascending order (namely, $x[1]<x[2]<x[3]< - - - <x[n-1]<x[n]$), meanwhile, the first (minimum) real number $x[1]$, the last (maximum) real number $x[n]$, and the total number n of the real numbers are determined.

The one-dimensional space between the first real number $x[1]$ and last real number $x[n]$ is divided at regular intervals into small one-dimensional spaces.—This is mere a conceptional operation for the sake of the following explanation—not necessary to perform actually.

The number of the divided small one-dimensional spaces is an integral number m which is one or more times, preferably few times as large as the number n of the real numbers $x[1]-x[n]$.

The database of the real numbers $x[i]$ (i: 1 to n) comprises a series Br of buckets B.

The number of the buckets B is the same as the above-mentioned integral number m, and the buckets B correspond to the above-mentioned number m of the small one-dimensional spaces, respectively.

Each bucket B is a set of data about the real number(s) falling in the corresponding small one-dimensional space and others as explained later.

All of the buckets B are provided with unique indexes called "bucket index". Hereinafter, integral numbers are used as the "bucket index" for illustrative purposes only, and a bucket B with a bucket index j is denoted by bucket $B[j]$ (j: 1 to m). From the first bucket to the last bucket, the bucket index is incremented one by one such that the bucket index of the first bucket is 1, and the bucket index of the last bucket is m.

As explained, the buckets $B[j]$ respectively correspond to the small one-dimensional spaces, and all of the small one-dimensional spaces have an identical spatial size. Therefore, each bucket $B[j]$ may be considered as a one-dimensional space between a real number y1 and a real numbers y2, wherein y1<y2, and the difference y2−y1 is constant through all the buckets.

In this embodiment, each bucket $B[j]$ corresponds to a one-dimensional space not less than y1 and less than y2. Therefore, if one or more of the real numbers $x[i]$ (i: 1 to n) satisfy a condition $y1 \leq x[i] < y2$ of either one of the buckets $B[j]$ (j: 1 to m), then the one or more of the real numbers are determined as belonging to the bucket, and the bucket comprises data about the one or more of the real numbers.

In practice, such data about the real number may be the real number or value itself or an address at which the real number is actuary stored.

Each of the buckets $B[j]$ comprises data about its bucket size. The bucket size is the number of the real number(s) $x[i]$ belonging to the bucket $B[j]$ concerned.

In the case that there is no real number belonging to the bucket concerned, the bucket size is zero, therefore, the bucket comprises such data that the bucket size is zero.

Figure 3:
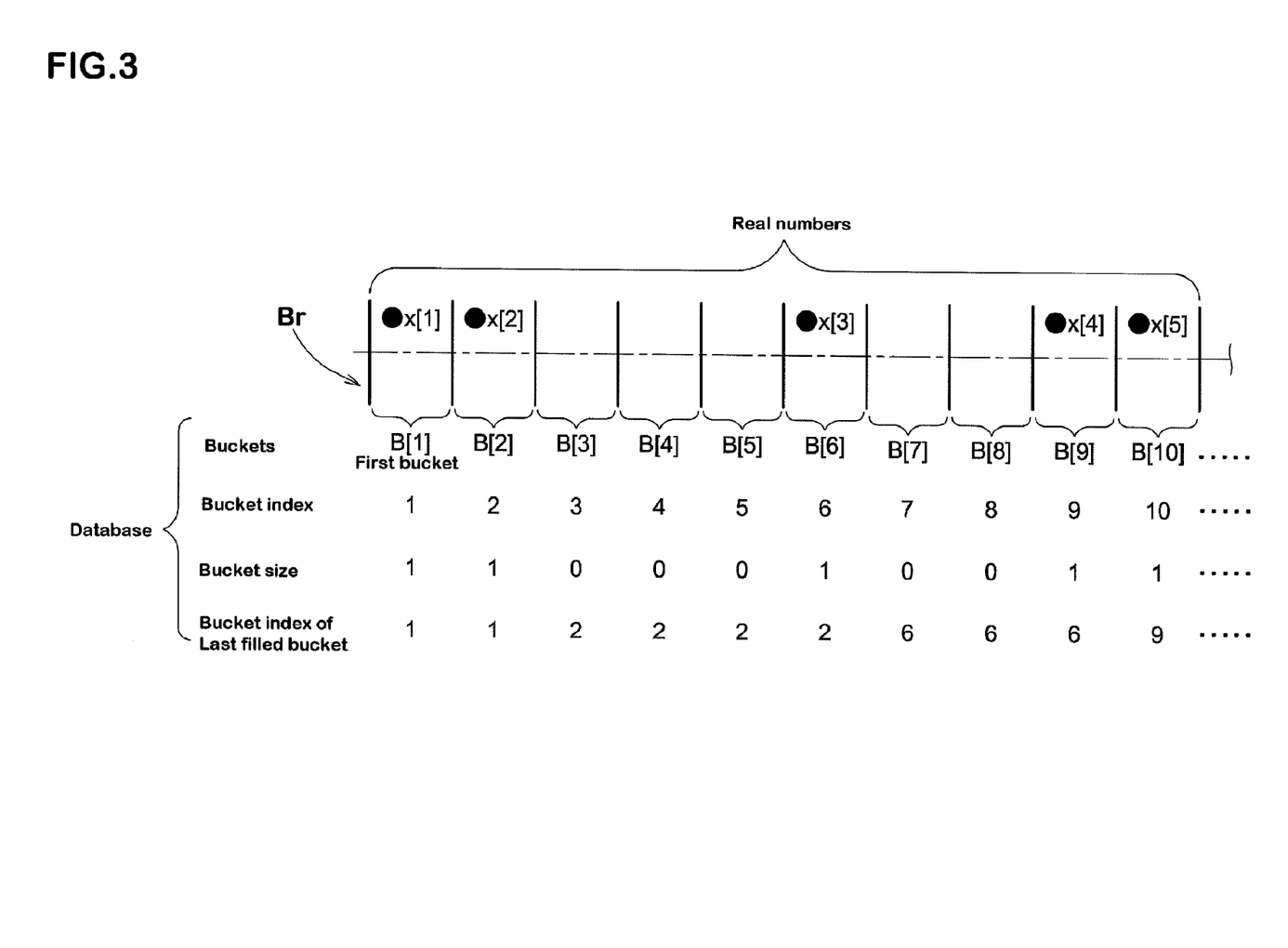
FIG. 3 is a diagram showing a simple example for explaining a set of real numbers and a database structure.

For example, in FIG. 3, the buckets $B[1]$, $B[2]$, $B[6]$, $B[9]$ and $B[10]$ each have one real number $x[1]$, $x[2]$, $x[3]$, $x[4]$, $x[5]$, respectively, therefore, the bucket sizes of these buckets B are equal to 1. The buckets $B[3]$, $B[4]$, $B[5]$, $B[7]$ and $B[8]$ have no real number, therefore, these buckets comprise date about the bucket sizes being equal to zero.

Each of the buckets $B[j]$ further comprises data about a bucket index of a last filled bucket ("BIofLFB" for short). Here, the last filled bucket is a bucket whose bucket size is not zero and whose bucket index is nearest to the bucket index of the concerned bucket.

In this invention, it is possible to treat the term "nearest" as having one of the following three meanings:
(1) nearest on the first bucket side of the concerned bucket,
(2) nearest on the final bucket side of the concerned bucket,
(3) nearest literally or regardless of the first bucket side and final bucket side. In this embodiment, the meaning (1) is adopted.

The real numbers $x[1]-x[n]$ sorted in ascending order are scanned, starting from $x[1]$ to $x[n]$, in order to determine if each real number $x[i]$ satisfies a condition $y1 \leq x[i] < y2$ of either one of the buckets, and thereby to determine which one of the buckets the real number $x[i]$ belongs to.

During this scan operation performed from $x[1]$ to $x[n]$, if the bucket whose bucket size is not zero is found, then the bucket index thereof is put in a variable for BIofLFB allocated on working memory.

In the case of the first bucket $B[1]$, its own bucket index, namely, "1" is treated as the BIofLFB, and the first bucket $B[1]$ comprises data about the BIofLFB being 1.

Each bucket whose bucket size is not zero, further, comprises data about the minimum and maximum of the real number(s) belonging to the concerned bucket.

In the case that the bucket size is "1", namely, only a single real number belongs to the concerned bucket, this single real number is treated as the minimum and maximum real numbers. Namely, the minimum and maximum real numbers are equal to the single real number.

Figure 4:
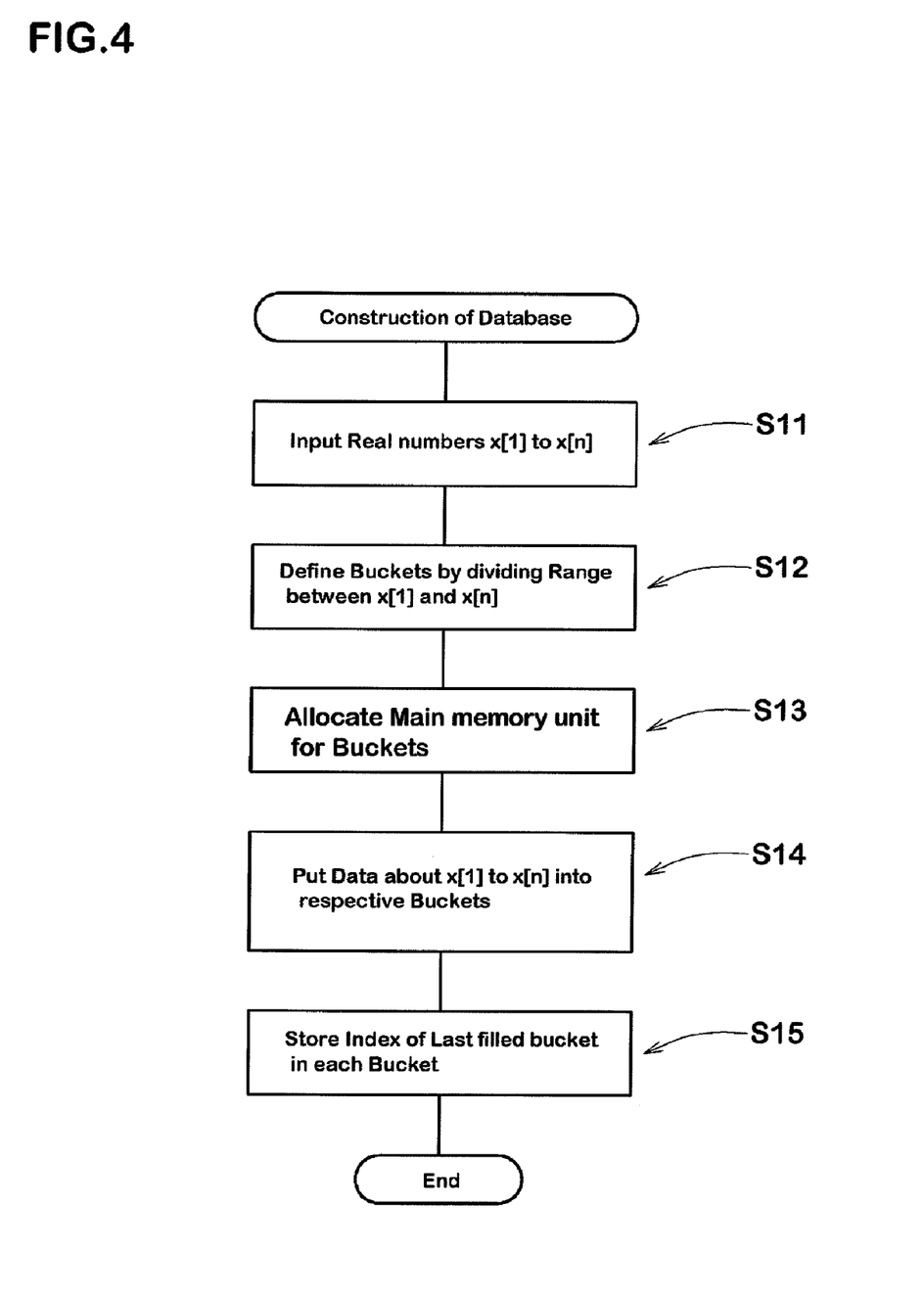
FIG. 4 is a flowchart of a construction phase in which the database is prepared.

FIG. 4 shows an example of the construction phase S1, wherein:—

The central processing unit 2 loads the real numbers $x[1]$ to $x[n]$ in the main memory unit 3.—(step S11)

The central processing unit 2 define the range (y1 to y2) of each bucket based on the range ($x[1]$ to $x[n]$) of the real numbers divided by the number m.—(step S12)

In this embodiment, the integral number m is determined by a person as above, and put in the computing device 1 as a variable by the use of the input device 5.

The central processing unit 2 allocate the main memory unit 3 for the buckets $B[1]$ to $B[m]$ needed for storing data about the bucket size, the BIofLFB, the real number(s) and the minimum and maximum thereof.—(step S13)

The central processing unit 2 puts data about the real numbers $x[i]$ to $x[n]$ into the respective buckets in the main memory unit 3.—(step S14)

The step S14 is as follow. Using the integral number m and the real numbers x[1] and x[n], the spatial size Δx of a bucket is determined by the following expression (1).

$$\Delta x = (x[n] - x[1])/m \quad (1)$$

All of the buckets have the same spatial size Δx.

Then, for each of the real numbers x[i] (i: 1 to n), the central processing unit 2 evaluates the following expression (2).

$$ibucket = \#floor((x[i] - x[1])/\Delta x) + 1 \quad (2)$$

wherein #floor(y) is a function which returns the largest integral value not greater than y.

Through this evaluation, it is determined that the real number x[i] belongs to bucket B[ibucket] (namely, a bucket whose bucket index is "ibucket").

Therefore, the central processing unit 2 puts data about the real number x[i] into the bucket B[ibucket], and performs the calculation of the following assignment expression (3) in order to increment the bucket size stored in the bucket B[ibucket] by one.

$$bucket\ size = bucket\ size + 1 \quad (3)$$

If need arises as a results of the inclusion of the real number x[i] into the bucket B[ibucket], then the central processing unit 2 updates the minimum real number and/or maximum real number stored in the bucket B[ibucket].

In the meantime, there is a possibility that the database include buckets whose bucket size is zero. Accordingly, it is expedient to exclude such zero-size buckets from the nearest neighbor search.

Therefore, for each of the buckets B[j] excepting the first bucket B[1], the central processing unit 2 determines the BIofLFB, and stores data about the BIofLFB in the bucket B[j].—(step S15)

The step S15 is as follows.

In this embodiment in which the above-mentioned meaning (1) is adopted, the last filled bucket is a bucket whose bucket size is not zero and whose bucket index is nearest to the concerned bucket on the first bucket side.

Therefore, the last filled bucket is defined by the following conditions (a), (b) and (c):

(a) p<k
(b) bucket size of bucket B[p]>0
(c) difference k−p is minimum wherein
p is the BIofLFB, and
k is the bucket index of the current bucket concerned.

Figure 5:
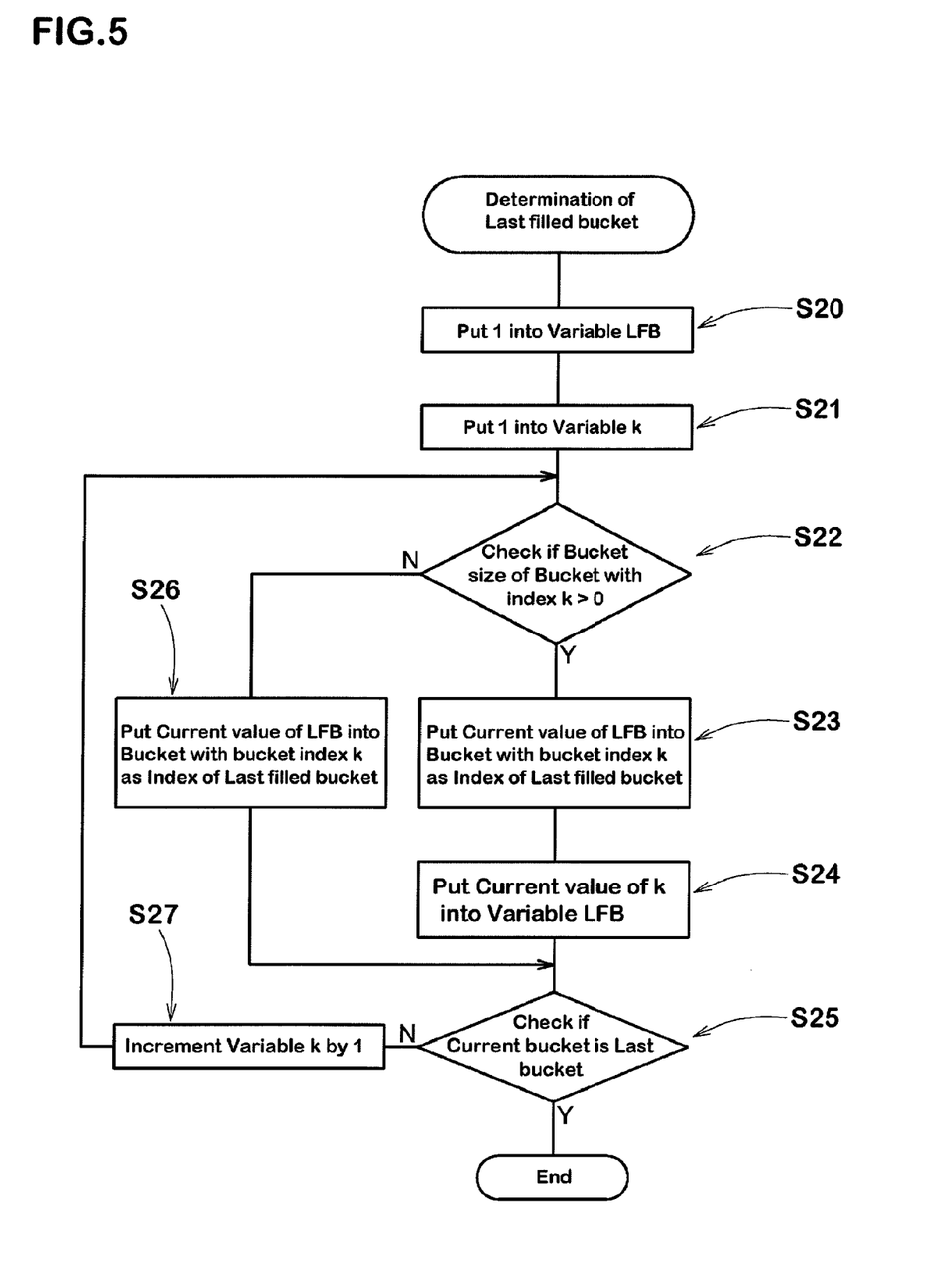
FIG. 5 is a flowchart showing the steps of setting the bucket index of the last filled bucket.

FIG. 5 shows an example of a sequence of operations by which the central processing unit 2 determines the BIofLFB.

First, the central processing unit 2 puts 1 (integral number) into both of a variable LFB and a variable k.—(step S20, S21)

With respect to the bucket B with bucket index equal to the variable k (hereinafter "bucket B[var.k]" for short), the central processing unit 2 determines if the bucket size is more than zero.—(step S22)

In the step S22, if the result is true (Y) (namely, more than zero), then the central processing unit 2 stores the current value of the variable LFB in the bucket B[var.k] as the date about the BIofLFB. (step S23)

Then, the central processing unit 2 updates the variable LFB to be equal to the bucket index of the current bucket B[var.k].—(step S24)

Then the sequence goes to step S25.

In the step S22, if the result is false (No) (namely, equal to zero), then the central processing unit 2 stores the current value of the variable LFB in the bucket B[var.k] as the date about the BIofLFB.—(step S26)

Then the sequence goes to step S25, without updating or changing the variable LFB.

In the step S25, the central processing unit 2 judges if the variable k which is the bucket index of the current bucket is equal to the bucket index of the last bucket (namely, m).

If the result is true (Yes) (namely, value of k=m), then the construction phase ends.

If the result is false (No) (namely, value of k<m), then the central processing unit 2 increments the variable k by one (step S27), and the sequence goes to the step S22. These steps are repeated till the last bucket B[m].

Through the construction phase, the database for used in the search phase S2 is prepared. Such construction phase is performed only once before the search phase S2.

Usually, the main memory unit 3 is faster in the access speed than the auxiliary storage device, therefore, the database is allocated on the main memory unit 3. It is however also possible to allocate the database on the auxiliary storage device.

Figure 6:
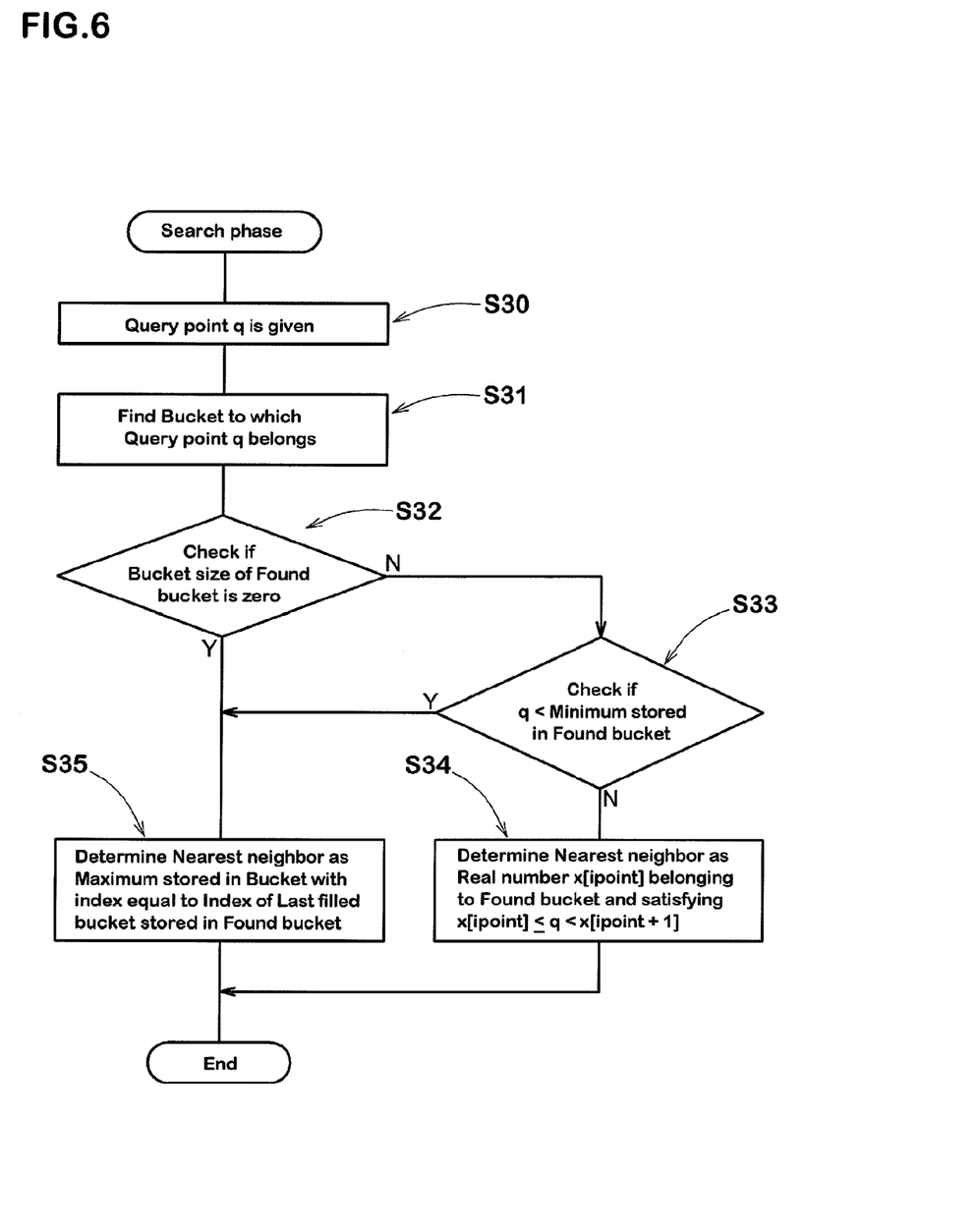
FIG. 6 is a flowchart of a search phase.

FIG. 6 shows an example of a sequence of operations by which the central processing unit 2 determines the nearest neighbor.

When a query point q is given (step S30), the central processing unit 2 determines the bucket index "ibucket" of a bucket which the query point q belongs to.—(step S31)

As explained above, all of the buckets have the identical spatial size Δx. Therefore, the bucket index "ibucket" can be obtained easily by evaluating the following expression (4).

$$ibucket = \#floor((q - x[1])/\Delta x) + 1 \quad (4)$$

wherein, #floor(y) is a function which returns the largest integral value not greater than y.

Then, the central processing unit 2 judges if the bucket size of the bucket B[ibucket] is zero.—(step S32)

In the step S32, if the result is false (No) (namely, bucket size >0), then the central processing unit 2 searches the real number(s) belonging to or contained in the bucket B[ibucket] for the nearest neighbor.—(step S33, step S34)

More specifically, the central processing unit 2 compares the query point q with the minimum real number stored in the bucket B[ibucket].

If the query point q is less than the minimum real number (in the step S33, Yes), then it is determined that the nearest neighbor is the maximum real number stored in the last filled bucket whose bucket index is stored in the bucket B[ibucket].—(step S35)

If the query point q is not less than the minimum number (in the step S33, No), then the central processing unit 2 searches the real number(s) belonging to or contained in the bucket B[ibucket] for a real number x[ipoint] which satisfies a condition x[ipoint]≦q<x[ipoint+1], and it is determined that the nearest neighbor is the real number x[ipoint].—(step S34)

In the step S32, if the result is true (Yes) (namely, bucket size=0), then, for the nearest neighbor, the central processing unit 2 searches the real number(s) belonging to or contained in the last filled bucket whose bucket index is stored in the bucket B[ibucket].—(step S35)

According to the present invention, as explained above, the whole search is performed on one of the buckets during the subsequent steps to the step S32. Therefore, the nearest neighbor can be found very quickly, and the computing time can be greatly decreased.

In the above-explained embodiment, a real number not more than the query point q and nearest to the query point q is found as the nearest neighbor.

But, it is also possible to find the nearest neighbor as a real number not less than the query point q and nearest to the query point q.—the above-mentioned meaning (2)
In order to find this type of nearest neighbor, it is necessary to change as follows:

the BIofLFB is the bucket index of a bucket which is nearest to the bucket concerned on the last bucket side of the bucket concerned;

in the step S33, the maximum real number is substituted for the minimum real number;

in the step S35, the minimum real number is substituted for the maximum real number; and in the step S34, the nearest neighbor is a real number x[ipoint] satisfying a condition x[ipoint]≧q>x[ipoint−1].

Simplified Example

Figure 7:
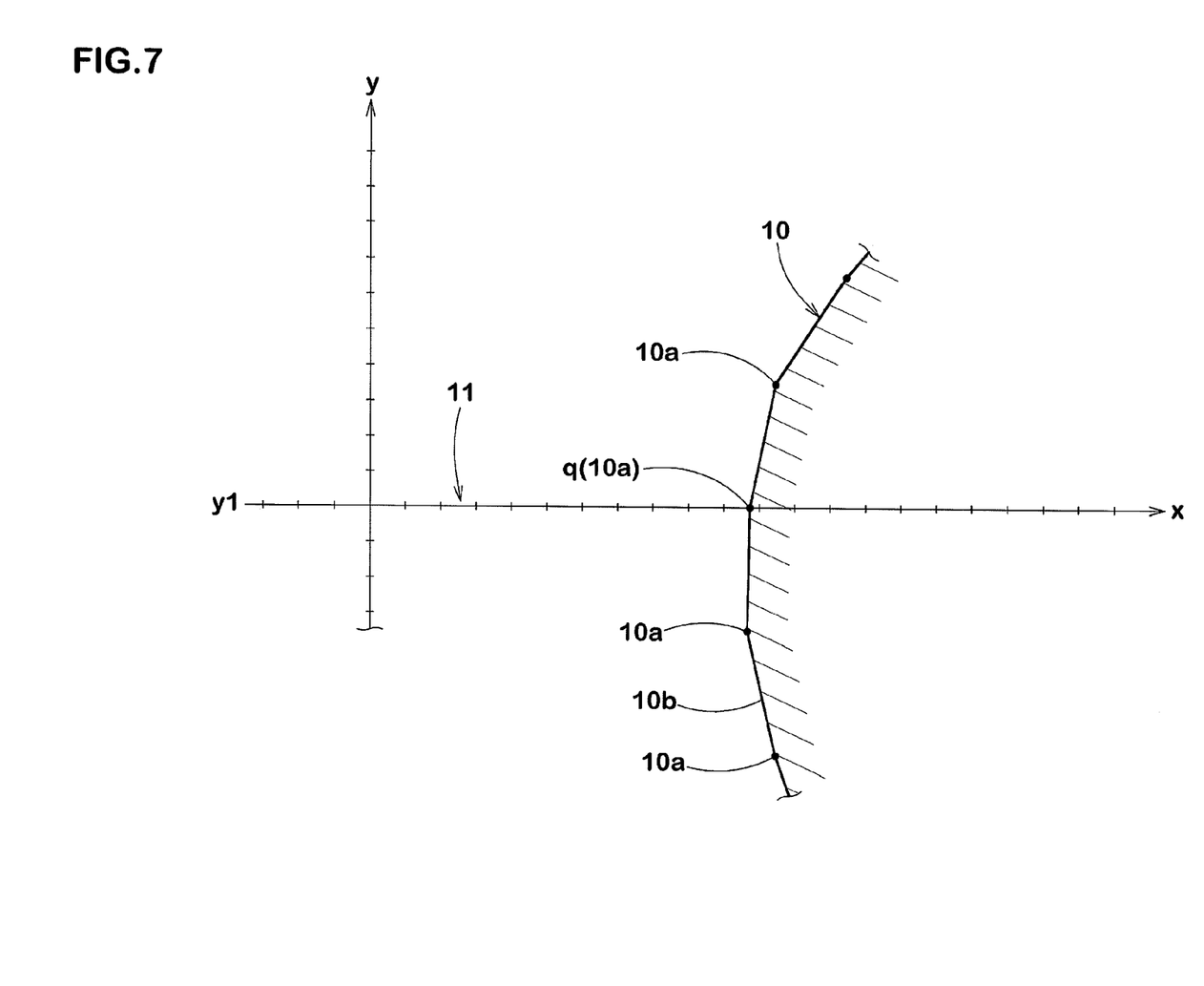
FIG. 7 is a diagram for explaining a simplified example of a two-dimensional model for used in an aero-dynamical simulation.

FIG. 7 shows a two-dimensional model for simulating aerodynamics of a golf ball. In this example, in order to simulate airflow around the golf ball,
a model 11 of air surrounding the golf ball is defined by Euler elements as orthogonal grids, and
a model 10 of a golf ball is defined by Lagrangian elements.

The golf ball model 10 has nodes 10a which have X-Y coordinate values and between which sides or lines 10b extend to define a Lagrangian mesh.

In order to make detailed analyses of airflow occurring near the surface of the golf ball, the air model 11 has a nonuniform grid structure or Euler mesh such that the grids are gradually decreased in the size towards the surface of the golf ball model 10.

In this example, given as the query point q is an x-coordinate value of a node point of the golf ball model 10 which node point has a Y-coordinate value (y1).
x-coordinate values of the air model 11 are given as a set of real numbers x[i] and searched for the nearest neighbor which is not more than the query point q and nearest to the query point q.

Table 1A is a listing of the x-coordinate values of the air model 11 (real numbers x[i]) sorted in ascending order.

Table 1B shows an example of the database thereof. In this example, Δx=1.6, and the minimum of the x-coordinate value (namely, x[1]) is 0, therefore, twelve real numbers from 0 to less than 1.6 belong to the first bucket B[1].

TABLE 1A

| Real numbers (X-coordinate) |
| --- |
| 0 |
| 0.004 |
| 0.018 |
| 0.048 |
| 0.1 |
| 0.18 |
| 0.294 |
| 0.448 |
| 0.648 |
| 0.9 |
| 1.21 |
| 1.584 |
| 2.028 |
| 2.548 |
| 3.15 |
| 3.84 |
| 4.624 |
| 5.508 |
| 6.498 |
| 7.6 |
| 8.82 |
| 10.164 |
| 11.638 |
| 13.248 |
| 15 |
| 16.9 |
| 18.954 |
| 21.168 |
| 23.548 |
| 26.1 |
| 28.83 |
| 31.744 |
| 34.848 |
| 38.148 |
| 41.65 |
| 45.36 |
| 49.284 |
| 53.428 |
| 57.798 |
| 62.4 |

TABLE 1B

| Bucket index | Bucket coordinate (Δx = 1.6) | Real numbers belonging | Bucket size | BIofLFB *1 | Minimum real number | Maximum real number |
| --- | --- | --- | --- | --- | --- | --- |
| 1 | 0 | 0, 0.004, 0.018, 0.048, 0.1, 0.18, 0.294, 0.448, 0.648, 0.9, 1.21, 1.584 | 12 | 1 | 0 | 1.584 |
| 2 | 1.6 | 2.028, 2.548, 3.15 | 3 | 1 | 2.028 | 3.15 |
| 3 | 3.2 | 3.84, 4.624 | 2 | 2 | 3.84 | 4.624 |
| 4 | 4.8 | 5.508 | 1 | 3 | 5.508 | 5.508 |
| 5 | 6.4 | 6.498, 7.6 | 2 | 4 | 6.498 | 7.6 |
| 6 | 8 | 8.82 | 1 | 5 | 8.82 | 8.82 |
| 7 | 9.6 | 10.164 | 1 | 6 | 10.164 | 10.164 |
| 8 | 11.2 | 11.638 | 1 | 7 | 11.638 | 11.638 |
| 9 | 12.8 | 13.248 | 1 | 8 | 13.248 | 13.248 |
| 10 | 14.4 | 15 | 1 | 9 | 15 | 15 |
| 11 | 16 | 16.9 | 1 | 10 | 16.9 | 16.9 |
| 12 | 17.6 | 18.954 | 1 | 11 | 18.954 | 18.954 |
| 13 | 19.2 | | 0 | 11 | | |
| 14 | 20.8 | 21.168 | 1 | 11 | 21.168 | 21.168 |
| 15 | 22.4 | 23.548 | 1 | 14 | 23.548 | 23.548 |
| 16 | 24 | | 0 | 14 | | |
| 17 | 25.6 | 26.1 | 1 | 14 | 26.1 | 26.1 |
| 18 | 27.2 | 28.83 | 1 | 17 | 28.83 | 28.83 |

TABLE 1B-continued

| Bucket index | Bucket coordinate ($\Delta x = 1.6$) | Real numbers belonging | Bucket size | BIofLFB *1 | Minimum real number | Maximum real number |
|---|---|---|---|---|---|---|
| 19 | 28.8 |  | 0 | 18 |  |  |
| 20 | 30.4 | 31.744 | 1 | 18 | 31.744 | 31.744 |
| 21 | 32 |  | 0 | 20 |  |  |
| 22 | 33.6 | 34.848 | 1 | 20 | 34.848 | 34.848 |
| 23 | 35.2 |  | 0 | 22 |  |  |
| 24 | 36.8 | 38.148 | 1 | 22 | 38.148 | 38.148 |
| 25 | 38.4 |  | 0 | 24 |  |  |
| 26 | 40 |  | 0 | 24 |  |  |
| 27 | 41.6 | 41.65 | 1 | 24 | 41.65 | 41.65 |
| 28 | 43.2 |  | 0 | 27 |  |  |
| 29 | 44.8 | 45.36 | 1 | 27 | 45.36 | 45.36 |
| 30 | 46.4 |  | 0 | 29 |  |  |
| 31 | 48 | 49.284 | 1 | 29 | 49.284 | 49.284 |
| 32 | 49.6 |  | 0 | 31 |  |  |
| 33 | 51.2 |  | 0 | 31 |  |  |
| 34 | 52.8 | 53.428 | 1 | 31 | 53.428 | 53.428 |
| 35 | 54.4 |  | 0 | 34 |  |  |
| 36 | 56 |  | 0 | 34 |  |  |
| 37 | 57.6 | 57.798 | 1 | 34 | 57.798 | 57.798 |
| 38 | 59.2 |  | 0 | 37 |  |  |
| 39 | 60.8 |  | 0 | 37 |  |  |
| 40 | 62.4 | 62.4 | 1 | 37 | 62.4 | 62.4 |

*1) BIofLFB: Bucket index of Last filled bucket

For example, if "52" is given as the query point q, in order to determine the bucket B[ibucket] to which this value belongs to, the central processing unit evaluates the above-explained expression (2) as follows.

$$ibucket = \#floor((x[i] - x[1])/\Delta x) + 1 \quad (2)$$
$$= \#floor((52 - 0)/1.6) + 1$$
$$= 33$$

Then, the central processing unit checks the bucket size of the bucket B[33].
Since the bucket size of the bucket B[33] is zero, the central processing unit reads the BIofLFB.
Since the BIofLFB is "31", the central processing unit reads the maximum real number stored in the bucket B[31].
Since the maximum real number is "49.284", the central processing unit answers "49.284" as the nearest neighbor of the query point "52".
If "7" is given an the query point q, ibucket is "5". The bucket size of the bucket B[5] is "2". Therefore, the central processing unit searches the real numbers belonging to the bucket B[5] for the nearest neighbor.
Specifically, the central processing unit determines if the query point "7" is less than the minimum real number (=6.498) stored in the bucket B[5].
In this case, since the results is false, the central processing unit searches the real numbers belonging to the bucket B[5] for a real number x[ipoint] satisfying a condition $x[ipoint] \leq q < x[ipoint+1]$. Thus, the nearest neighbor is determined as 6.498.

Large-Sized Example

In order to show the advantageous effect of the present invention, three-dimensional model for simulating aerodynamics of a golf ball was prepared, and the nearest neighbor search method according to the present invention was compared with ANN method.

The three-dimensional model of a golf ball was defined by Lagrangian elements having nodes with 3,755,598 coordinate values.
As the three-dimensional air model, two models A and B defined by Euler elements were prepared. The air model A had 63,050,400 coordinate values (x-coordinate values: 252, Y-coordinate values: 100, z-coordinate values: 2502).
The air model B had 150,700,400 coordinate values (x-coordinate values: 502, Y-coordinate values: 100, z-coordinate values: 3002).
Each of the 3,755,598 coordinate values of the golf ball model was given as a query point, and the coordinate values of the air model A, B are searched for the nearest neighbor.
The test results are shown in Table 2.

TABLE 2

| Method | Invention | ANN (bucket size = 1) | ANN (bucket size = 3) |
|---|---|---|---|
| Search time (sec) |  |  |  |
| air model A | 0.82 | 208.8 | 165.6 |
| air model B | 0.83 | 401.2 | 340.9 |
| Time required for preparing database (sec) |  |  |  |
| air model A | under 0.01 | about 5 | about 5 |
| air model B | under 0.01 | about 5 | about 5 |

INDUSTRIAL APPLICABILITY

For example, when airflow around a golf ball, flow of plasticizing rubber in an extruder for tire manufacturing and the like are to be simulated in order to study the behavior of a golf ball, the kneading action of a screw and the like, it is desirable that a model of such fluid is defined as structured grids of Euler mesh, and a model of such solid is defined as unstructured grids of Lagrangian mesh because the time required for preparing the models can be reduced, and it is relatively easy to increase the simulation accuracy. Therefore, in the case of a large-scale computer simulation, it is expected that the use of structured grids will be increased in the future. In this case, if the solid has a complicated shape, a very large computational cost is required for defining the boundary between the fluid and solid.

The present invention can be suitably applied to this kind of computation, and it is possible to greatly decrease the computing time and computational cost.

In the case of a simulation of a flying golf ball which requires to make analyses of fluid in three-dimensional space, the structured grids has coordinate values in three-dimensions, namely, (x, y, z) in the case of a orthogonal coordinate system, (r, z, θ) in a cylindrical coordinate system, and (r, θ, φ) in a spherical coordinate system.

In either system, by performing the method according to the present invention in each dimension, the computing time can be greatly decreased. For example, the search speed becomes 2 times or more faster than ANN and kd-tree methods.

Therefore, in a moving boundary problem of a rotating golf ball for example, especially the computational efficiency is increased, and it becomes possible to increase the number of the grids. As a result, the approximation accuracy of the space and simulation accuracy can be improved.

The invention claimed is:

1. A nearest neighbor search method of searching a set of real numbers x[i] (i: 1 to n) for a nearest neighbor to a query point q, comprising:
    a construction phase in which a database of the real numbers x[i] (i: integers from 1 to n, assigned in ascending order of the real numbers) is prepared in a main memory unit of a computing device;
    a search phase in which the computing device searches the nearest neighbor to the query point q by the use of the database, wherein:
    the database comprises a series of buckets;
    the buckets respectively correspond to small one-dimensional spaces defined by dividing a one-dimensional space between a minimum real number x[1] and a maximum real number x[n] at regular intervals, whereby the number of the buckets and the number of the small one-dimensional spaces are the same integral number m;
    the buckets have unique bucket indexes from the first bucket B[1] to the last bucket B[m];
    each of the buckets comprises data about real number(s) falling in one of the small one-dimensional spaces corresponding to the bucket concerned;
    each of the buckets further comprises data about its bucket size, the bucket size defined by the number of real number(s) falling in one of the small one-dimensional spaces which corresponds to the bucket concerned;
    each of the buckets excepting the first bucket B[1] further comprises data about the bucket index of a last filled bucket, the last filled bucket defined as a bucket whose bucket size is not zero and whose bucket index is closest to that of the concerned bucket; and
    the search phase comprises:
        a first step of locating one of the buckets corresponding to one of the small one-dimensional spaces in which the query point q falls;
        a second step of checking the bucket size of the located bucket whether the bucket size thereof is zero or not; and
        a third step of searching the nearest neighbor by the use of the data of real number(s) included in:
            the located bucket if the checked bucket size is not zero; or
            a bucket with a bucket index equal to the bucket index of the last filled bucket included in the located bucket if the checked bucket size is zero.

2. The nearest neighbor search method according to claim 1, wherein:
    the nearest neighbor is a real number not more than the query point and closest to the query point; and
    the last filled bucket is a bucket whose bucket size is not zero and whose bucket index is closest to that of the concerned bucket on the first bucket side.

3. The nearest neighbor search method according to claim 2, wherein the bucket whose bucket size is not zero, further comprises data about minimum and maximum of the real number(s) included in the bucket.

4. The nearest neighbor search method according to claim 3, wherein:
    in the third step, if the checked bucket size is not zero, then the query point q is compare with the minimum real number included in the bucket concerned; and
    if the query point q is less than the minimum, then the computing device makes a decision such that the nearest neighbor is the maximum real number included in the last filled bucket of which bucket index is included in the bucket concerned.

5. The nearest neighbor search method according to claim 3, wherein:
    in the third step, if the checked bucket size is not zero, then the query point q is compare with the minimum real number included in the bucket concerned; and
    if the query point q is not less than the minimum, then the computing device searches the real number(s) included in the concerned bucket for a real number satisfying a condition x[ipoint]≦q≦x[ipoint+1], and makes a decision such that the nearest neighbor is the real number x[ipoint].

6. The nearest neighbor search method according to claim 1, wherein:
    search points and a query point each having multidimensional -coordinate values are given,
    from the multidimensional-coordinate values of the search points and query point, coordinate values in each dimension are extracted as said set of real numbers x[i] and said query point q, and
    with respect to said set of real numbers x[i] and said query point q extracted in each dimension, the real numbers are searched for a nearest neighbor to the query point q.

7. The nearest neighbor search method according to claim 4, wherein:
    in the third step, if the checked bucket size is not zero, then the query point q is compare with the minimum real number included in the bucket concerned; and
    if the query point q is not less than the minimum, then the computing device searches the real number(s) included in the concerned bucket for a real number satisfying a condition x[ipoint]≦q<x[ipoint+1], and makes a decision such that the nearest neighbor is the real number x[ipoint].

8. The nearest neighbor search method according to claim 2, wherein:
    search points and a query point each having multidimensional -coordinate values are given,
    from the multidimensional-coordinate values of the search points and query point, coordinate values in each dimension are extracted as said set of real numbers x[i] and said query point q, and with respect to said set of real numbers x[i] and said query point q extracted in each dimension, the real numbers are searched for a nearest neighbor to the query point q.

9. The nearest neighbor search method according to claim 3, wherein:
search points and a query point each having multidimensional -coordinate values are given,
from the multidimensional-coordinate values of the search points and query point, coordinate values in each dimension are extracted as said set of real numbers x[i] and said query point q, and
with respect to said set of real numbers x[i] and said query point q extracted in each dimension, the real numbers are searched for a nearest neighbor to the query point q.

10. The nearest neighbor search method according to claim 4, wherein:
search points and a query point each having multidimensional -coordinate values are given,
from the multidimensional-coordinate values of the search points and query point, coordinate values in each dimension are extracted as said set of real numbers x[i] and said query point q, and
with respect to said set of real numbers x[i] and said query point q extracted in each dimension, the real numbers are searched for a nearest neighbor to the query point q.

11. The nearest neighbor search method according to claim 5, wherein:
search points and a query point each having multidimensional -coordinate values are given,
from the multidimensional-coordinate values of the search points and query point, coordinate values in each dimension are extracted as said set of real numbers x[i] and said query point q, and
with respect to said set of real numbers x[i] and said query point q extracted in each dimension, the real numbers are searched for a nearest neighbor to the query point q.

\* \* \* \* \*